W. R. FRENCH.
AUTOMOBILE SEAT.
APPLICATION FILED JUNE 2, 1917.

1,240,192.

Patented Sept. 18, 1917.
2 SHEETS—SHEET 1.

Witnesses
Arthur F. Draper
Karl H. Butler

Inventor
Will R. French
By
Attorneys

UNITED STATES PATENT OFFICE.

WILL R. FRENCH, OF DETROIT, MICHIGAN.

AUTOMOBILE-SEAT.

1,240,192.

Specification of Letters Patent.

Patented Sept. 18, 1917.

Application filed June 2, 1917. Serial No. 172,356.

*To all whom it may concern:*

Be it known that I, WILL R. FRENCH, a citizen of the United States of America, residing at Detroit, in the county of Wayne and State of Michigan, have invented certain new and useful Improvements in Automobile-Seats, of which the following is a specification, reference being had therein to the accompanying drawings.

This invention relates to adjustable rear seats for automobiles and similar vehicles, and the primary object of my invention is to provide a seat embodying side arms, a back, a head rest, and a seat, all of which may be easily and quickly adjusted so that the occupants of the seat may assume natural positions or from time to time change the angular relation of the back and seat so that the same will conform to different positions of the body, thus contributing to the comfort of the occupants of an automobile, especially when touring.

Another object of this invention is to provide a seat structure including side arms, a back and a seat that may be adjusted in synchronism and locked against accidental displacement.

A further object of my invention is to provide an adjustable automobile seat wherein the parts are constructed with a view of reducing the cost of manufacture and at the same time retain those features by which safety, durability and ease of adjustment and assembling are secured. With such ends in view, my invention resides in the novel construction, combination and arrangement of parts to be hereinafter specifically described and then claimed.

Reference will now be had to the drawings, wherein—

Figure 1:
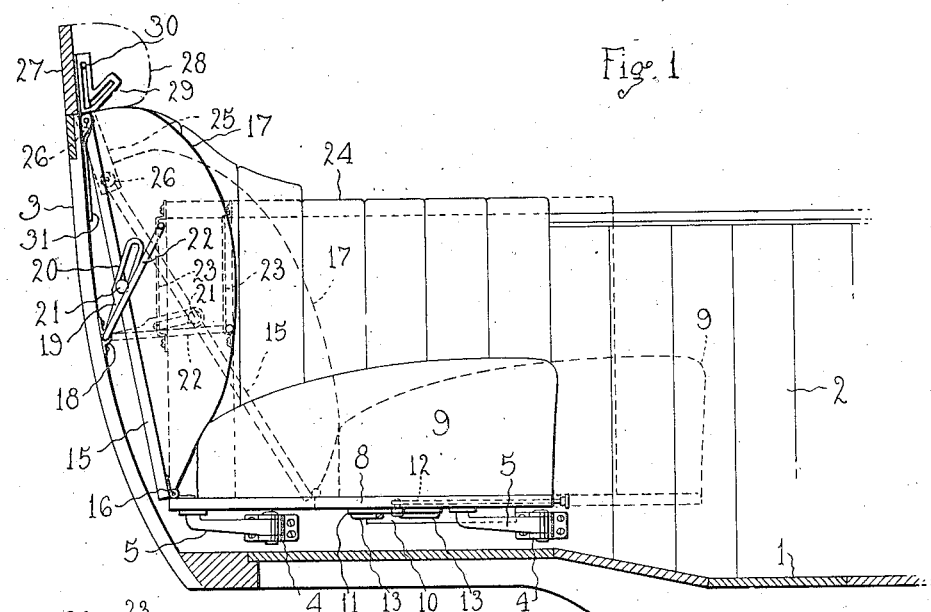
Figure 1 is a longitudinal sectional view of a portion of an automobile body provided with an adjustable rear seat in accordance with my invention.
Figure 2:
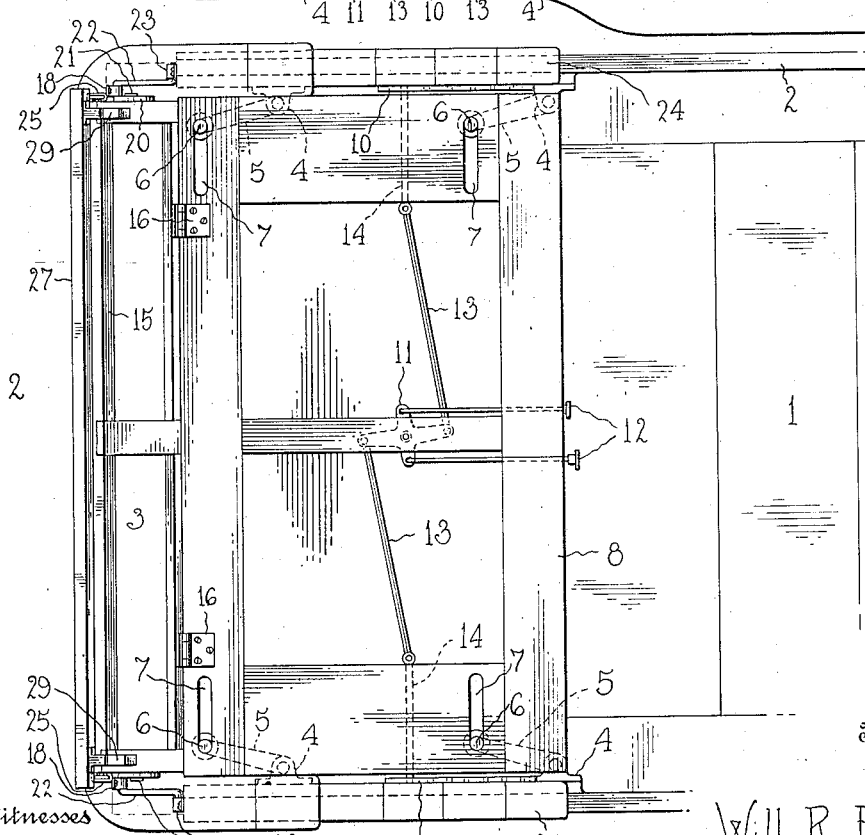
Fig. 2 is a plan of the same.
Figure 3:
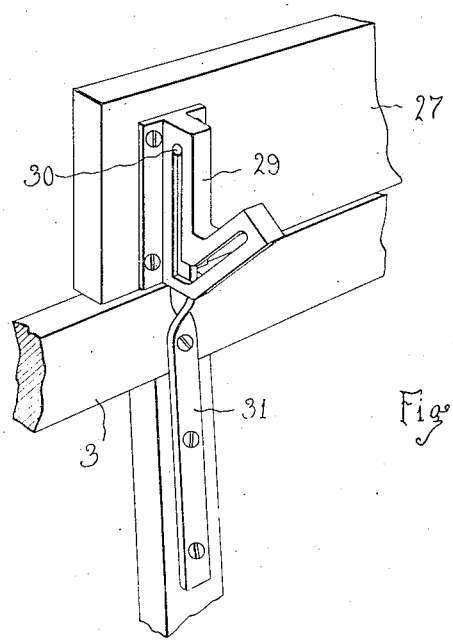
Fig. 3 is a perspective view of a portion of the head rest.
Figure 4:
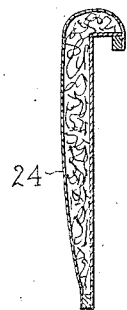
Fig. 4 is a cross sectional view of a detached adjustable side arm.

In describing my invention by aid of the views above referred to, I desire to point out that the same are intended as merely illustrative of an example by which my invention may be put into practice, and I do not care to confine myself to the precise construction and arrangement of parts shown. The following description is therefore to be broadly construed as including such substitute constructions and arrangement of parts which are the obvious equivalent of those to be hereinafter referred to.

In the drawings, 1 denotes the bed or floor of an automobile body, 2 the side walls thereof, and 3 a rear wall.

4 denotes sets of bearings carried by the inner sides of the walls 2, adjacent the floor 1, and pivotally connected to said bearings are sets of brackets 5 having the outer ends thereof provided with studs 6 extending into longitudinal slots 7 provided therefor in a seat frame 8. The seat frame 8 is adapted to support a cushion or seat 9 and to hold the seat frame in an adjusted position against accidental movement, the frame 8 is provided with a locking device to engage apertured plates 10 carried by the walls 2. The locking device comprises a pivoted member 11 carried by the bottom side of the frame 8 and connected to said member are push rods 12 operatable at the front edge of said seat frame. The pivoted member 11 is connected by links 13 to slidable rods 14 in the ends of the frame 8 and the rods 14 are adapted to enter apertures of the plate 10 and lock the seat frame against accidental movement. By pushing on one of the rods 12 the seat frame 8 is released for movement and by pushing on the other of said rods the seat frame is locked against movement.

15 denotes a back frame hinged to the rear edge of the seat frame 8, as at 16, and said back frame is adapted to hold the back.

18 denotes bearings carried by the rear wall 3 adjacent the ends of the back frame 15 and pivoted in these bearings are coupling members 19. The coupling members 19 are provided with slotted portions 20 to receive studs 21 caried by the ends of the back frame 15, and said coupling members have arms 22 extending into straps 23 carried by the rear ends of shiftable side arms 24. The side arms 24 are slidable on the walls 2 and are adapted for movement in synchronism with the back frame 15 and the seat frame 8.

25 denotes channel rails carried by the side walls 2 contiguous to the ends of the back frame 15 and said channel rails receive wheels or rollers 26, carried by the back frame 15 at the upper edge thereof.

Figure 5:
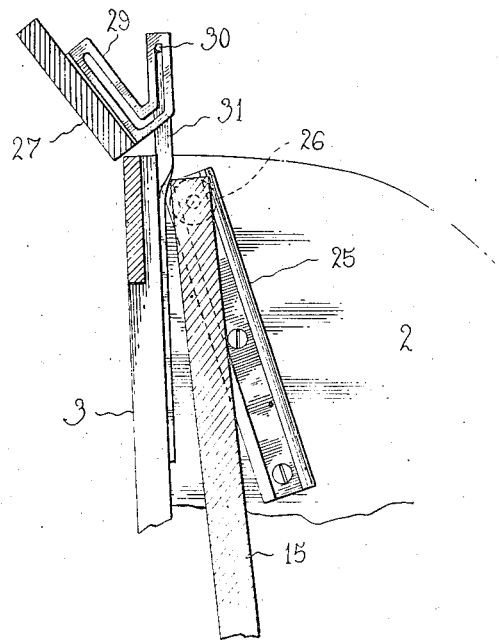
Fig. 5 is an enlarged vertical sectional view of a portion of the adjustable seat structure and head rest.

27 denotes a tiltable head rest frame adapted to support a head rest or cushion 28. At the ends of the frame 27 are slotted angle brackets 29 to receive pins 30 carried by the upper ends of straps 31 carried by the rear wall 3 of the automobile body. The slotted angle brackets 29 permit of the head rest frame 27 being maintained in the same plane as the rear wall 3 or tilted rearwardly, as shown in Fig. 5.

From the foregoing, it is apparent that the seat frame 8 may be moved forward to the dotted position shown in Fig. 1 and in consequence of such movement the back frame 15 is tilted, causing the adjustable side arms 24 to be shifted forward, so that the seat, back and arms can be conveniently used.

My invention is applicable to various types of automobiles and any style of upholstery can be readily used.

What I claim is:—

1. The combination with an automobile body having side walls and a rear wall, of sets of pivoted brackets carried by said side walls, a seat frame loosely connected to said brackets and capable of longitudinal movement in said automobile body, a back frame hinged to the rear edge of said seat frame, side arms slidable on the side walls of said body, and coupling members carried by the rear wall of said body and articulated with said back frame and said side arms for movement in synchronism with said seat frame.

2. The combination with an automobile body having side walls and a rear wall, of an adjustable seat frame supported from said side walls, an adjustable back frame connected to the rear edge of said seat frame, arms slidable on the side walls of said body, means articulating said arms and said back frame for movement in synchronism with and in the same direction as said seat frame, and means carried by said seat frame adapted for locking said seat frame in adjusted position.

3. The combination with an automobile body having side walls and a rear wall, of brackets carried by the side walls of said body, a seat frame loose on said brackets and capable of longitudinal movement with said automobile body, a back frame hinged to the rear edge of said seat frame, arms slidable on the side walls of said body, coupling members articulating said back frame and said arms for movement in synchronism with said seat frame, and means carried by said seat frame operatable at the front edge thereof and adapted to lock said seat frame at the ends thereof against accidental movement.

4. The combination with an automobile body, having side walls and a rear wall, of an adjustable seat frame supported in the side walls of said automobile body and capable of longitudinal movement in said automobile body, a back frame hinged to the rear edge of said seat frame, rails carried by the side walls of said automobile body, rollers carried by the ends of said back frame at the upper edge thereof engaging in said rails, arms slidable on the side walls of said body, and means articulating said arms and the ends of said back frame for movement in synchronism with said seat frame.

5. The combination with an automobile body having side walls and a rear wall, of sets of pivoted brackets carried by the side walls of said automobile body, a seat frame loose on said bracket and capable of longitudinal movement in said automobile body, a back frame hinged to the rear edge of said seat frame, rails carried by the side walls of said automobile body, rollers carried by the ends of said back frame at the upper edge thereof and engaging in said rails, and means carried by said seat frame operatable at the front edge thereof and adapted to lock the ends of said seat frame relative to said side walls.

In testimony whereof I affix my signature in the presence of two witnesses.

WILL R. FRENCH.

Witnesses:
ANNA M. DORR,
KARL H. BUTLER.